Oct. 29, 1963  T. A. SCANLAN  3,108,646
POWER CONNECTOR FOR KEY OPERATED CHUCKS
Filed Nov. 16, 1959
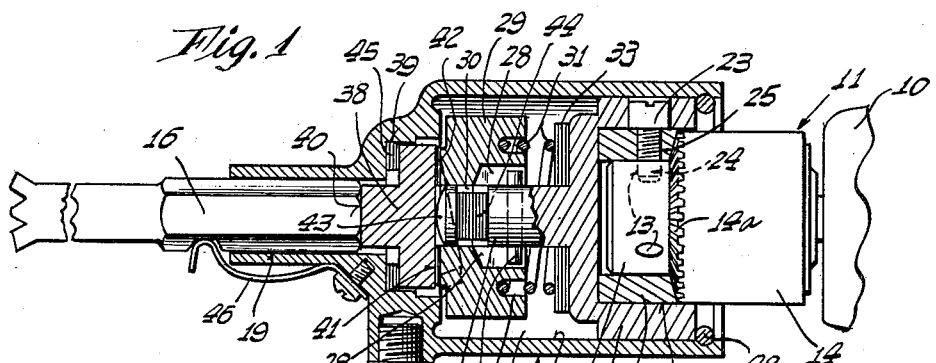
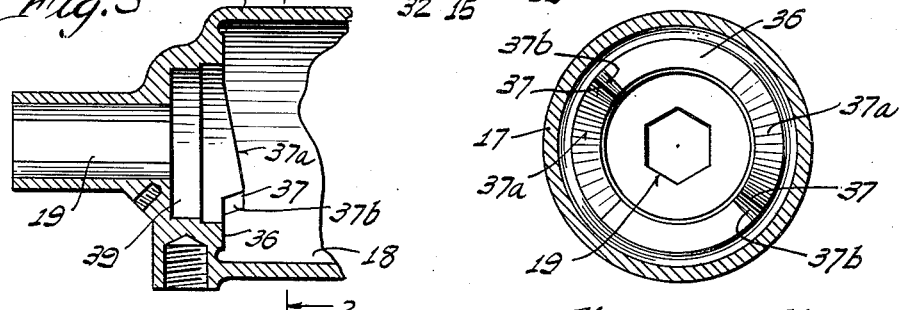
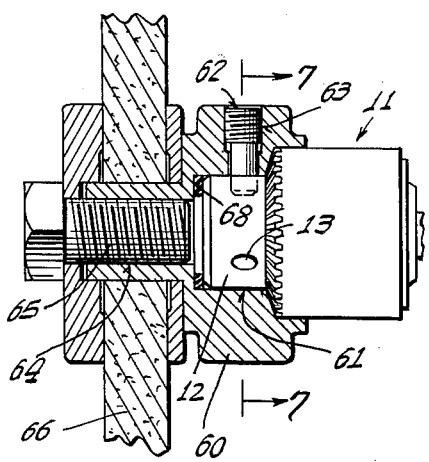
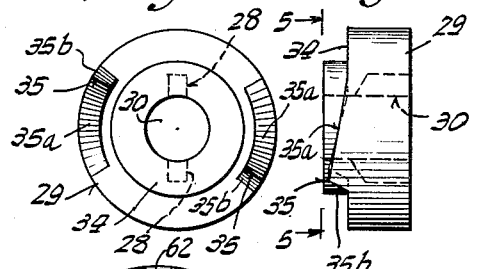
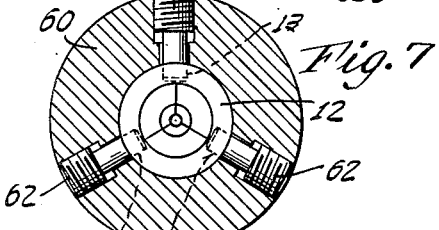
INVENTOR.
Thomas A. Scanlon
BY
Johnson and Kline
ATTORNEYS

United States Patent Office 3,108,646
Patented Oct. 29, 1963

3,108,646
POWER CONNECTOR FOR KEY OPERATED CHUCKS
Thomas A. Scanlan, Naugatuck, Conn., assignor to The Eastern Company, a corporation of Connecticut
Filed Nov. 16, 1959, Ser. No. 853,124
4 Claims. (Cl. 173—95)

The present invention relates to a connector that may be secured to a power driven key operated chuck to transmit the power from the chuck to the connector and more particularly to connectors that are easily and positively attached to the chuck.

The key operated chuck, to which the connector of the present invention is securable, is commonly referred to as a "Jacobs" chuck and includes a plurality of jaw members that are forced together to frictionally grasp a shank of a tool inserted therebetween. To increase the clamping of the jaws on the shank, the chuck is generally provided with a collar formed to have a gear which cooperates with a key having a gear, the key having a shaft extension that is adapted to project into holes formed in an annular sleeve of the chuck to provide a bearing surface. Rotation of the key provides a mechanical leverage greater than that obtainable by manual grasping to rotate the collar to increase the clamping action of the jaws. The holes for the key normally comprise three in number and are equally spaced 120° apart about the periphery of an annular sleeve to extend radially inward. While such a chuck has many advantages, it is subject to slippage between the jaws and the tool shank and also is relatively inflexible in the kind of tools that may be driven thereby because each tool must have a shank that is enterable into the jaws.

An object of the present invention is to provide a power connector that will positively transmit the power from a rotary chuck which, in turn, can then be employed to drive a tool driven by the connector.

Another object of the present invention is to provide a power connector that is easily attached to a key type chuck and which is durable in use, relatively easy to secure and remove from the chuck and which positively transfers the power from the chuck.

A further object of the present invention is to provide power connectors that may be easily and positively secured to a key type chuck for transforming the rotary motion of the chuck into reciprocating blows such as hammer loads or other connectors that may hold tools not heretofore useable in a key operated chuck.

In carrying out the present invention, a power connector is secured onto the chuck by having a cylindrical recess in a driving member into which the annular sleeve of the chuck is positioned. At least one screw, if not the same number of screws equal to the number of key holes in the chuck, is mounted in threaded apertures on the driving member to be moved radially inward to position their unthreaded ends within the key hole of the chuck and thus securely lock the connector to the chuck. As the exterior dimensions of the chuck may be within relatively wide tolerances as may the position of the key holes with respect to each other the present invention provides for each screw to have a reduced end portion that is somewhat less in diameter than the key hole so that the variations in dimensions and locations of the key holes between chucks may be accommodated. Also by having a resilient member engaging the chuck, variations in exterior dimensions between chucks may also be accommodated and yet still provide a positive securement between the adapter and a chuck.

Other features and advantages will hereinafter appear.

In the drawing:

FIGURE 1 is an axial section of a power connector of the present invention that attaches to a key operated chuck and causes reciprocatory blows on a tool when the chuck is rotated.

FIG. 2 is a radial section taken on the line 2—2 of FIG. 3.

FIG. 3 is a sectional detail of the housing of the connector of FIG. 1.

FIG. 4 is a side view of the hammer part of the connector of FIG. 1.

FIG. 5 is a view of the hammer part looking in the direction of the arrows 5—5 of FIG. 4.

FIG. 6 is a further embodiment of the power connector of the present invention shown in axial section which is employed to rotate a tool.

FIG. 7 is a sectional view taken on the line 7—7 of FIG. 6.

Referring to the drawing, there is generally shown a motor 10 which rotates a key operated chuck 11 in the manner well known in the art. It will, of course, be appreciated that rather than having the motor closely adjacent the chuck, as on a portable electric drill, the chuck may be secured on a spindle of a drill press or other machine having a rotating shaft. The chuck 11 is provided with an annular sleeve 12 which has three radial key holes 13 adapted to receive the shaft extension, a key (not shown), the key cooperating with gear teeth 14a formed on an annular collar 14 to tighten the chuck jaws.

In accordance with the present invention, the power connector of the embodiment shown in FIGS. 1–5 is generally indicated by the reference numeral 15 and is secured to the chuck and transmits the rotary motion of the chuck into reciprocatory blows. An end of a tool 16, such as a star drill, is received in one end of the connector while its other end surrounds the exposed end of the chuck 11. The power connector 15 includes a hollow housing 17 having a cylindrical opening 18 at one end and a hexagonal opening 19 of reduced diameter at the other end. It will be appreciated that the opening 19 is shaped to fit the shape of the tool shank 16 to prevent relative rotation therebetween yet enable axial movement therebetween.

An annular bushing 20 circumscribes the annular sleeve 12 of the chuck with the bushing being contained within a cylindrical opening 21 of an annular member 22, the bushing and member 22 constituting a driving member with a cylindrical recess being defined by the bushing. A screw 23, one being shown, though as many may be employed as there are key holes 13 in the chuck, extends axially through the member 22 and bushing 20 to have its unthreaded end portion 24 positioned within the key hole 13. The screw is movable axially by being in threadable engagement with a threaded radial aperture 25 formed in the bushing while its head is recessed into the member 22. It will be appreciated that the screw 23 joins the parts, the annular sleeve 12, the bushing 20 and the member 22 and thus rotation of the chuck 11 is positively transmitted to the member 22.

The member 22 has a shaft portion 26 in which is secured a diametrically extending pin 27. The ends of the pin 27 are positioned within a groove 28 formed in a hammer part 29 which is formed to have a central aperture 30 into which the end of the shaft portion extends. A cylindrical spring 31 has one end portion received within an annular groove 32 formed on one face of the hammer part and the other end of the spring bears against a plurality of washers 33 that are against the member 22. The other face of the hammer part 29 is provided with a radial surface 34 having outwardly extending projections 35 (shown specifically in FIGS. 4 and 5) diametrically opposite to each other with each having a long rise 35a and an abrupt fall 35b. The housing is also provided with a radial surface 36 (FIG. 3) which has a pair of diametrically disposed inwardly directed projections 37, i.e. toward the chuck, which are aligned with the projections 35 and have a long rise 37a and an abrupt fall 37b. An anvil means 38 is positioned within a stepped cylindrical recess 39 of the housing and has one reduced radial face 40 engaging the end surface of the tool end 16, while its other face 41 is separated from the end 34 of the hammer part by a washer 42. There is further provided a retaining button 43 which bears against the center of the face 41 of the anvil means 38 and is urged thereagainst as by a compressed member 44 which may be either resilient material or a spring.

In order to reduce the impact of the anvil member on the housing, resilient washers 45 are positioned between the housing and the anvil means. To further aid the user in the operation of the power connector a spring clip 46 may be employed to maintain the tool in the power connector and a handle 47 may be screwed into the housing to enable the user to rotatingly move the housing and tool as the tool receives the blows of the anvil means. To maintain the above parts in the position shown, a "C" washer 48 is located in a groove of the housing and removal of the "C" washer 48 permits the housing to be moved relative to the member 22 and hence provide access to the screws 23, though an access hole to the screw may be provided through the housing if desired.

With the parts positioned as shown in FIG. 1, rotation of the motor 10 will rotate the chuck 11 and sleeve 12 which will positively drive, through the key holes 13 having the screws therein, the driving member composed of the bushing and the member 22 and cause the same to rotate relative to the housing. This, in turn, causes the pin operating in the groove to rotate the hammer part. As the hammer part rotates, the projections 35 engage the projections 37 and force the hammer part axially toward the chuck 11 against the action of the spring 31. As soon as the projections have passed each other, the spring forces the hammer part axially to cause the surface of the hammer part to hit the face of the anvil means through the washer 42 and this reciprocatory blow is transmitted by the anvil means to the tool end 16. Continued rotation of the chuck 11 will cause successive blows to be delivered to the tool end. It will be appreciated that the housing is thus freely rotatable with respect to the driving member, hammer part and anvil means and that the force of the blows to the housing is minimized by the resilient members 45.

Referring to FIG. 6 there is shown a further embodiment of the present invention of a power connector that is positively securable to the chuck and to which a tool may be secured. As shown in FIGS. 6 and 7, the key operated chuck 11 has the annular sleeve 12 and the key holes 13. The power connector includes a driving member 60 having a cylindrical recess 61 into which the sleeve 12 of the chuck is positioned. Three screws 62, which may be set screws, are threadable in threaded radial apertures 63 formed in the driving member to enable axial movement of the screws so that their unthreaded ends may enter and leave the holes 13. The apertures 63 have only the upper portion threaded and of a larger diameter than the lower portion to limit the inward axial movement of the screws. The other end of the driving member is provided with an axial, threaded bore 64 into which is threaded a bolt 65. In the present embodiment it is desired to rotate an annular grinding wheel 66 by the power connector and to secure the grinding wheel to the driving member, a pair of washers having the cross-sectional shape shown that engage the sides of the grinding wheel, are provided. It will be appreciated that tightening the bolt 65 serves to clamp the grinding wheel between the two washers and hence as the chuck is rotated, it positively transmits its rotary force through the set screws to the driving member and then, through the washers, to the grinding wheel.

In order to enable the power connectors of the present invention to fit chucks having dimensions within substantially wide tolerances, the unthreaded ends of the screws are reduced in size and hence do not have to be exactly axially aligned with the key holes to enter the holes since they in effect are self-locating. Moreover, a resilient washer 68 is positioned between the chuck and the end of the cylindrical recess that receives the chuck to accommodate variations in length of the chuck and to cushion the parts to hold them snug. While this washer is only shown in the embodiment of the invention shown in FIGS. 6 and 7, it is within the scope of the present invention to employ it in the connector disclosed in FIGS. 1–5.

It accordingly will be appreciated that there has been disclosed a power connector which is capable of being attached to a key operated chuck, such as a "Jacobs" chuck, in a manner that prevents slippage between the connector and the clutch. This is accomplished by the use of screws that are threaded in the connector for axial movement and have unthreaded chamfered ends that enter the key holes in the chuck so that the rotary movement of the chuck is positively transferred to the power connector.

Variations and modifications may be made within the scope of the claims and portions of the improvements may be used without others.

I claim:

1. A power connector for use with a key operated chuck having three peripherally spaced radial key holes formed in an annular sleeve comprising a driving member formed with a cylindrical recess into which the sleeve of the chuck is adapted to be positioned, three peripherally spaced threaded radial apertures formed in the driving member and leading into the cylindrical recess and adapted to be positioned in alignment with the key holes, a screw threaded into each aperture and having an unthreaded end portion enterable into its associated key hole to positively secure the driving member to the chuck, said driving member having a shaft portion having tool securing means thereon to enable a tool to be secured to the driving member.

2. A power connector for use with a key operated chuck having at least one radial key hole formed in an annular sleeve comprising a driving member formed with a cylindrical recess into which the sleeve of the chuck is adapted to be positioned, a threaded radial aperture formed in the driving member and leading into the cylindrical recess and adapted to be positioned in alignment with the key hole, a screw threaded into the aperture and having an unthreaded end portion enterable into the key hole to positively secure the driving member to the sleeve, said driving member having a shaft portion and a diametrically extending pin mounted on the shaft, a hammer member formed to provide an axial groove into which said pin is slidable, said hammer member further having a face formed with axially extending projections, a housing having projections engageable with the hammer member projections to cause axial movement of the hammer member, said housing substantially encircling the driving member and means mounting the housing for rotational movement relative to the chuck and driving member, a spring urging the hammer member towards the projections on the housing, a tool holding means formed in the housing and anvil means positioned to be engaged by the hammer member and engage the tool to deliver the reciprocatory blow from the hammer member to the tool as the driving member is rotated.

3. The invention as defined in claim 1 in which the shaft portion includes a reduced diameter part formed with an axial threaded bore, a pair of washers on said shaft portion, and a bolt threaded into the bore to cause the washers to compressingly engage a tool positioned on the shaft portion to be rotated by the driving member.

4. The invention as defined in claim 1 in which there is a resilient member positioned in the bottom of the cylindrical recess and the unthreaded ends of the screws positionable in the key holes are reduced in size to substantially less than the size of the key holes to enable the power connector to be secured to chucks having relatively wide tolerances.

References Cited in the file of this patent

UNITED STATES PATENTS

| | | |
|---|---|---|
| 1,158,270 | Payne | Oct. 26, 1915 |
| 1,530,138 | Rush | Mar. 17, 1925 |
| 1,596,708 | Bellows | Aug. 17, 1926 |
| 1,665,173 | Misener | Apr. 3, 1928 |
| 2,073,861 | Wolf | Mar. 16, 1937 |
| 2,211,216 | Oster | Aug. 13, 1940 |
| 2,260,070 | Wilhide | Oct. 21, 1941 |
| 2,293,443 | Mossberg | Aug. 18, 1942 |
| 2,382,642 | Kinglesmith | Aug. 14, 1945 |
| 2,397,026 | Marker et al. | Mar. 19, 1946 |
| 2,465,309 | Happe | Mar. 22, 1949 |
| 2,670,580 | Stiles | Mar. 2, 1954 |

FOREIGN PATENTS

| | | |
|---|---|---|
| 1,019,668 | France | Jan. 26, 1953 |